(12) United States Patent
Hunt et al.

(10) Patent No.: US 7,257,731 B2
(45) Date of Patent: Aug. 14, 2007

(54) SYSTEM AND METHOD FOR MANAGING PROTOCOL NETWORK FAILURES IN A CLUSTER SYSTEM

(75) Inventors: Peter Frederick Hunt, Sunnyvale, CA (US); Anand Subramanian, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 304 days.

(21) Appl. No.: 10/747,017

(22) Filed: Dec. 23, 2003

(65) Prior Publication Data

US 2005/0138462 A1 Jun. 23, 2005

(51) Int. Cl.
*G06F 11/00* (2006.01)
(52) U.S. Cl. .................. 714/4; 709/224; 709/223
(58) Field of Classification Search .................. 714/4, 714/43; 709/223, 224
See application file for complete search history.

(56) References Cited

U.S. PATENT DOCUMENTS

| | | | |
|---|---|---|---|
| 6,006,259 A | 12/1999 | Adelman et al. | |
| 6,078,957 A * | 6/2000 | Adelman et al. | 709/224 |
| 6,205,562 B1 * | 3/2001 | Fukushima et al. | 714/43 |
| 6,308,282 B1 * | 10/2001 | Huang et al. | 714/4 |
| 6,542,934 B1 * | 4/2003 | Bader et al. | 709/239 |
| 6,691,244 B1 | 2/2004 | Kampe et al. | |
| 6,763,479 B1 * | 7/2004 | Hebert | 714/4 |
| 6,802,021 B1 * | 10/2004 | Cheng et al. | 714/4 |
| 6,813,242 B1 * | 11/2004 | Haskin et al. | 370/229 |
| 6,883,108 B2 * | 4/2005 | Lee et al. | 714/4 |
| 6,976,071 B1 * | 12/2005 | Donzis et al. | 709/224 |
| 2002/0007468 A1 * | 1/2002 | Kampe et al. | 714/4 |
| 2004/0049573 A1 * | 3/2004 | Olmstead et al. | 709/224 |
| 2004/0078632 A1 * | 4/2004 | Infante et al. | 714/5 |
| 2004/0153701 A1 * | 8/2004 | Pickell | 714/4 |
| 2004/0267980 A1 * | 12/2004 | McBrearty et al. | 710/38 |
| 2005/0125557 A1 * | 6/2005 | Vasudevan et al. | 709/239 |

FOREIGN PATENT DOCUMENTS

| | | |
|---|---|---|
| CN | 1342362 A | 3/2002 |
| CN | 1369992 A | 9/2002 |

OTHER PUBLICATIONS

Newton, Harry, Newton's Telecom Dictionary, Feb. 2002, CMP Books, 18th Ed., p. 164.*
Notification of Transmittal of the International Search Report or the Declaration, dated Mar. 21, 2006, 9 pages.
English translation of "Notification of the First Office Action," Chinese Patent application No. 200410104811.2, dated Feb. 9, 2007.

* cited by examiner

*Primary Examiner*—Christopher McCarthy
(74) *Attorney, Agent, or Firm*—Brake Hughes Bellermann LLP

(57) ABSTRACT

Methods and systems are directed to managing a protocol network failure in a network clustering system. A cluster master and each client member in the cluster are configured to determine a primary protocol network, a secondary protocol network, and the like, for exchanging a cluster protocol message. Each client member in the cluster determines its 'active protocol network' from at least the primary protocol network, and the secondary protocol network when it joins the cluster. Each client member tests its connectivity to the cluster master through the primary protocol network. If a client member detects a failure on the primary protocol network, it dynamically fails over to the secondary protocol network, or the like, without leaving the cluster. If connectivity to the primary protocol network is restored, the client member dynamically resumes the protocol message exchange on the primary protocol network without leaving the cluster.

13 Claims, 11 Drawing Sheets

SYSTEM AND METHOD FOR MANAGING PROTOCOL NETWORK FAILURES IN A CLUSTER SYSTEM

FIELD OF THE INVENTION

The present invention relates to computing systems, and in particular, to a system and method for managing a protocol network failure in a network clustering system.

BACKGROUND

The Internet has evolved into a ubiquitous network that has inspired many companies to rely upon it as a major resource for doing business. For example, many businesses may utilize the Internet, and similar networking infrastructures, to manage critical applications, access content servers, automate assembly and production lines, and implement complex control systems. Such reliance by businesses has driven the demand for higher protection and availability guarantees to resources over the network.

In response to the need for a networking infrastructure that provides both high availability of system resources and protection from failures, cluster architecture was developed. A cluster can be defined as multiple loosely coupled network devices that cooperate to provide client devices access to a set of services, resources, and the like, over the network. Members in the cluster may be employed to increase the reliability and availability of the access.

Many cluster architectures rely on an exchange of a cluster protocol message over the network. The cluster may utilize these messages to manage cluster membership, assign work, and detect member failure. The cluster may designate one of the networks to which it is connected to exchange the protocol messages.

However, the designated network, and its related connections and interconnections, are potential points of failure to the cluster. If a cluster member loses connectivity to the network, it is unable to participate in the protocol and often must leave the cluster. This may result in lost work, as well as degraded overall performance, access, and reliability of the cluster. Additionally, if the network fails, say due to a failure of a switch, hub, or the like, then the entire cluster fails and all connectivity through the cluster is lost. Therefore, there is a need in the industry for a highly reliable clustering infrastructure. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refers to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

The term "packet" includes an IP (Internet Protocol) packet.

Briefly stated, the present invention is directed to a system and method for managing a protocol network failure in a network clustering system. The invention includes a cluster master and a client member of the cluster that are configured to determine at least one primary protocol network and a secondary protocol network for exchanging cluster protocol messages. Each client member in the cluster determines whether to employ the primary protocol network or the secondary protocol network as its 'active' protocol network when it joins the cluster. Each client member tests its connectivity to the cluster master through the primary protocol network. If a client member detects a failure on the primary protocol network, it may dynamically fail over to the secondary protocol network without leaving the cluster. If connectivity to the primary protocol network is restored, the client member may dynamically resume the protocol message exchange on the primary protocol network, without leaving the cluster.

Illustrative Operating Environment

Figure 1:
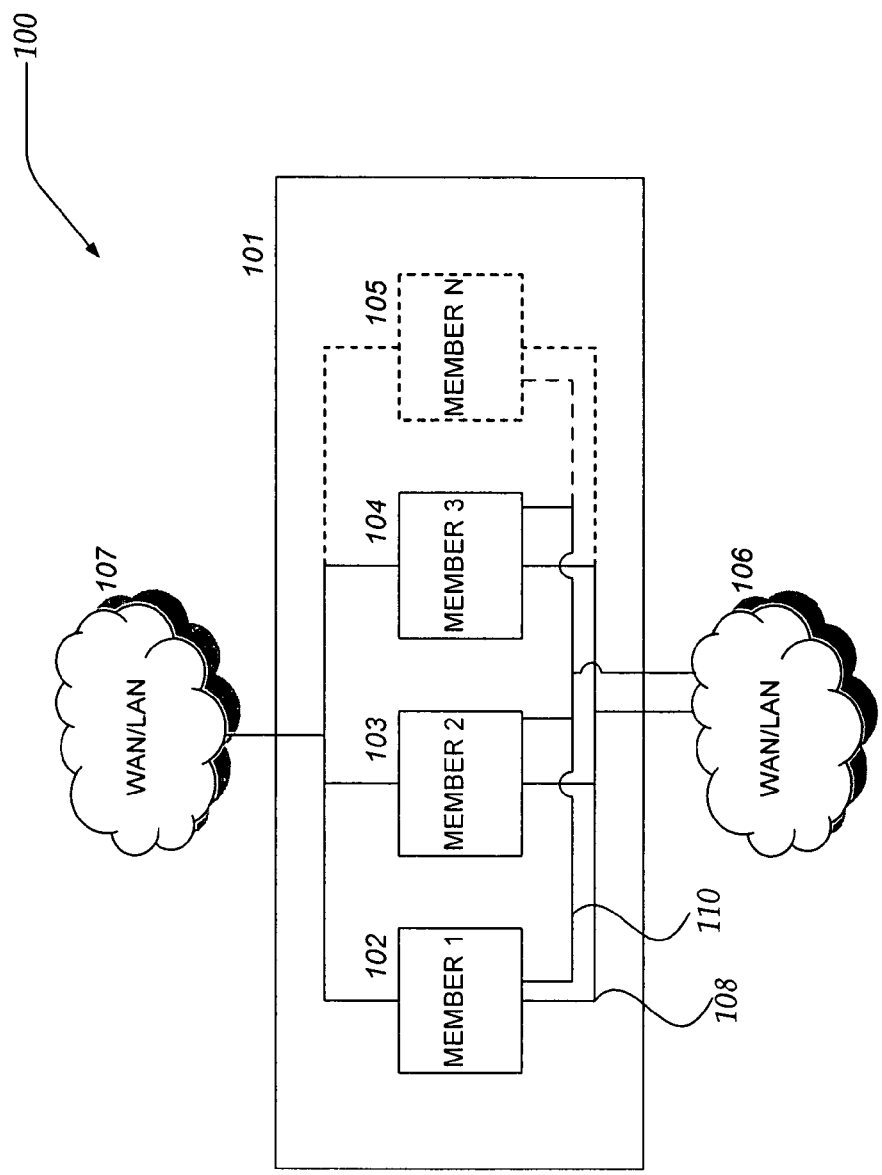
FIG. 1 illustrates one embodiment of an environment in which the invention operates.

FIG. 1 illustrates one embodiment of an environment in which an invention operates. Not all the components may be required to practice the invention, and variations in the arrangement and type of the components may be made without departing from the spirit or scope of the invention.

As shown in the figure, cluster system 100 includes Local Area Network/Wide Area Networks (LAN/WANs) 106 and 107 and cluster 101. Cluster 101 includes cluster members 102-105. Cluster 101 is in communication with LAN/WANs 106 and 107.

Cluster members 102-105 may be in communication with LAN/WANs 106 and 107 through a plurality of networks. For example, although not illustrated, a plurality of network connections may exist between cluster members 102-105 and LAN/WAN 107. A plurality of network connections may further exist between cluster members 102-105 and LAN/WAN 106. However, for clarity, only networks 108 and 110 are illustrated in FIG. 1. In one embodiment, network 108 is a primary protocol network, and network 110 is a secondary protocol network. A protocol network includes virtually any network, including its interconnections, and the like, that is employed for an exchange of a cluster protocol message. The protocol networks may be selected based on a variety of mechanisms, including but not limited to, pre-configuring a network to be the primary protocol network and another network to be the secondary protocol network. Protocol networks may also be selected dynamically, based on any of a variety of characteristics, including quality of service, throughput, stability, speed, and the like. Moreover, as described below, each member 102-105 may select a different primary and/or secondary protocol network from another member 102-105.

Cluster 101 typically is configured to include loosely coupled network devices that may cooperate to provide another device with access to a service, resource, and the like. In one embodiment, cluster 101 is configured to optimize message throughput by adaptively load balancing cluster members 102-105.

Cluster members 102-105 may be any network device capable of sending and receiving a packet over the network in a cluster architecture. In one embodiment, cluster members 102-105 are configured to operate as a protocol stack processor for a received message packet. The set of such devices may include devices that typically connect using a wired communications medium such as personal computers, multiprocessor systems, microprocessor-based or programmable consumer electronics, network PCs, and the like, that are configured to operate as a cluster device. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like, that are configured as a cluster device. Alternatively, cluster members 102-105 may be any device that is capable of connecting using a wired or wireless communication medium such as a PDA, POCKET PC, wearable computer, and any other device that is equipped to communicate over a wired and/or wireless communication medium, operating as a cluster device.

A member of cluster members 102-105 may be configured to operate as a cluster master, where remaining cluster members 103-105 may be configured to operate as client cluster members. However, cluster 101 is not so limited, and another member in cluster members 103-105, may be configured to operate as a backup cluster master, without departing from the scope of the present invention. Cluster members 102-105 may also elect a member as cluster master dynamically, when the cluster is formed and subsequently after a cluster master failure. One embodiment of cluster members 102-105 is described in more detail below, in conjunction with FIG. 2.

LAN/WANs 106 and 107 are enabled to employ any form of computer readable media for communicating information from one electronic device to another. In addition, LAN/WANs 106 and 107 can include the Internet in addition to local area networks (LANs), wide area networks (WANs), direct connections, such as through a universal serial bus (USB) port, other forms of computer-readable media, and any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, LAN/WANs 106 and 107 may include any communication method by which information may travel between network devices.

Typically, LAN/WAN 106 may include a content server, application server, and the like, to which cluster 101 enables access to for another network device residing within LAN/WAN 107.

Figure 2:
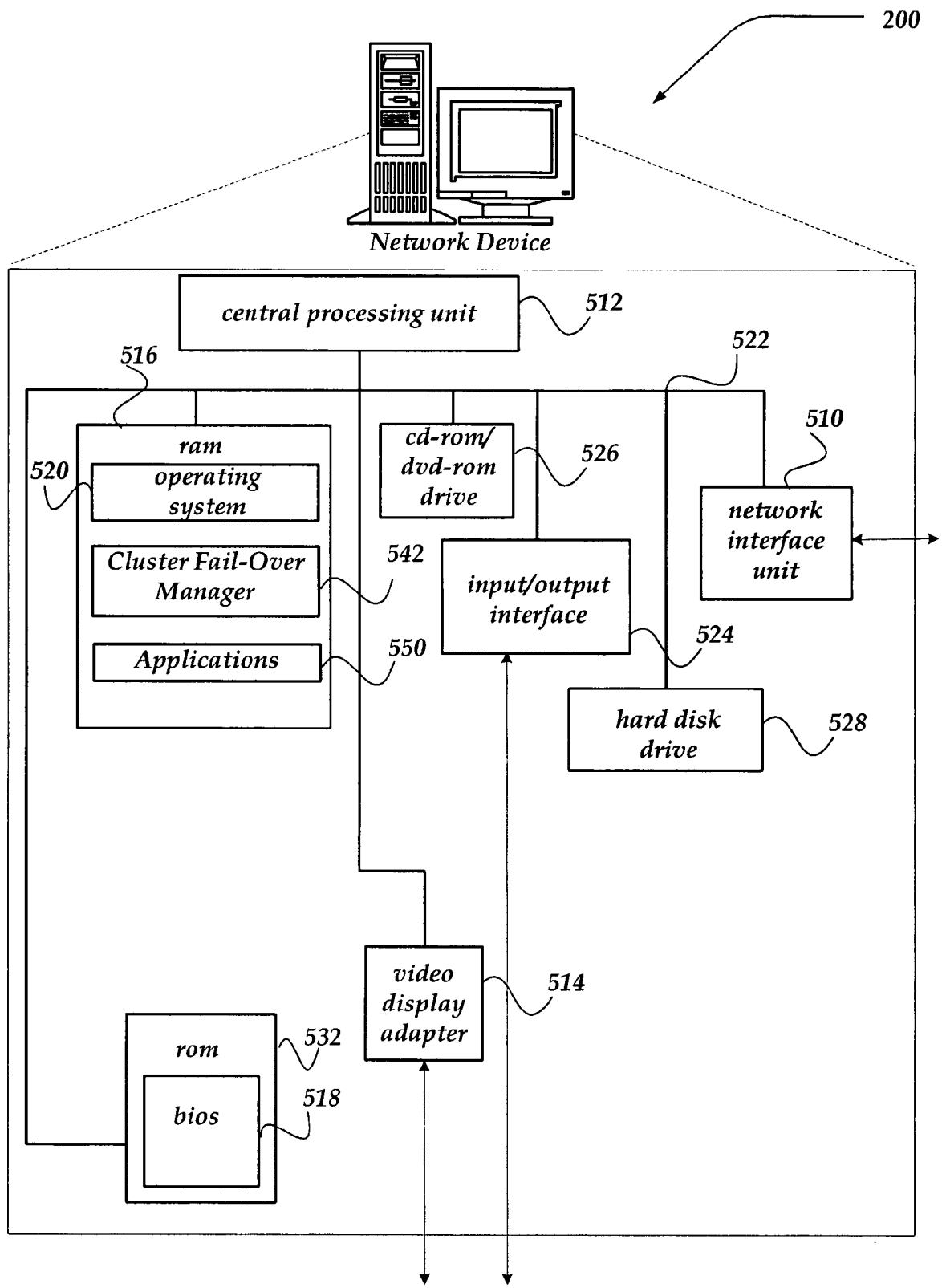
FIG. 2 illustrates a functional block diagram of one embodiment of a network device configured as a cluster member.

FIG. 2 illustrates a functional block diagram of one embodiment of a network device 200 to which may operate as a cluster member. Network device 200 may include many more components than those shown. The components shown, however, are sufficient to disclose an illustrative embodiment for practicing the invention.

Network device 200 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of network device 200. Any general-purpose operating system may be employed. Basic input/output system ("BIOS") 518 is also provided for controlling the low-level operation of network device 200.

As illustrated in FIG. 2, network device 200 also can communicate with the Internet, or some other communications network, such as LAN/WANS 106 AND 107 in FIG. 1, via network interface unit 510, which is constructed for use with various communication protocols including the TCP/IP protocol. Network interface unit 510 is sometimes known as a transceiver or transceiving device.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

In one embodiment, the mass memory stores program code and data for implementing operating system 520. The mass memory may also store additional program code and data for performing the functions of network device 200. One or more applications 550, and the like, may be loaded into mass memory and run on operating system 520. As shown in the figure, cluster fail-over manager 542 is an example of an application that may run on operating system 520.

Network device 200 may also include an SMTP handler application for transmitting e-mail, an HTTP handler application for receiving and handing HTTP requests, and an HTTPS handler application for handling secure connections. The HTTPS handler application may initiate communication with an external application in a secure fashion. Network device 200 is not limited however, to these handler applications, and many other protocol handler applications may be employed by network device 200 without departing from the scope of the invention.

Network device 200 may also include input/output interface 524 for communicating with external devices, such as a mouse, keyboard, scanner, or other input devices not shown in FIG. 2. Likewise, network device 200 may further include additional mass storage facilities such as CD-ROM/DVD-ROM drive 526 and hard disk drive 528. Hard disk drive 528 is utilized by network device 200 to store, among other things, application programs, databases, and the like.

Illustrative Operation for Managing a Protocol Network Failure in the Cluster System One embodiment of a general operation of the present invention is now described by reference to a cluster establishment, processes for a cluster master to manage client members in the cluster, and processes for a client member in the cluster.

During establishment of a cluster, such as cluster 101 of FIG. 1, a joining network device may send a protocol message on both a primary and secondary protocol network, to determine which network may be used to communicate with the cluster master. The selected protocol network is typically called the "active protocol network". In one embodiment, if the joining network device can use both the primary and secondary protocol networks, the primary protocol network is preferred as the active protocol network. The joining network device may however, employ the secondary protocol network if it does not see a protocol message from the cluster master on its primary protocol network.

Figure 3:
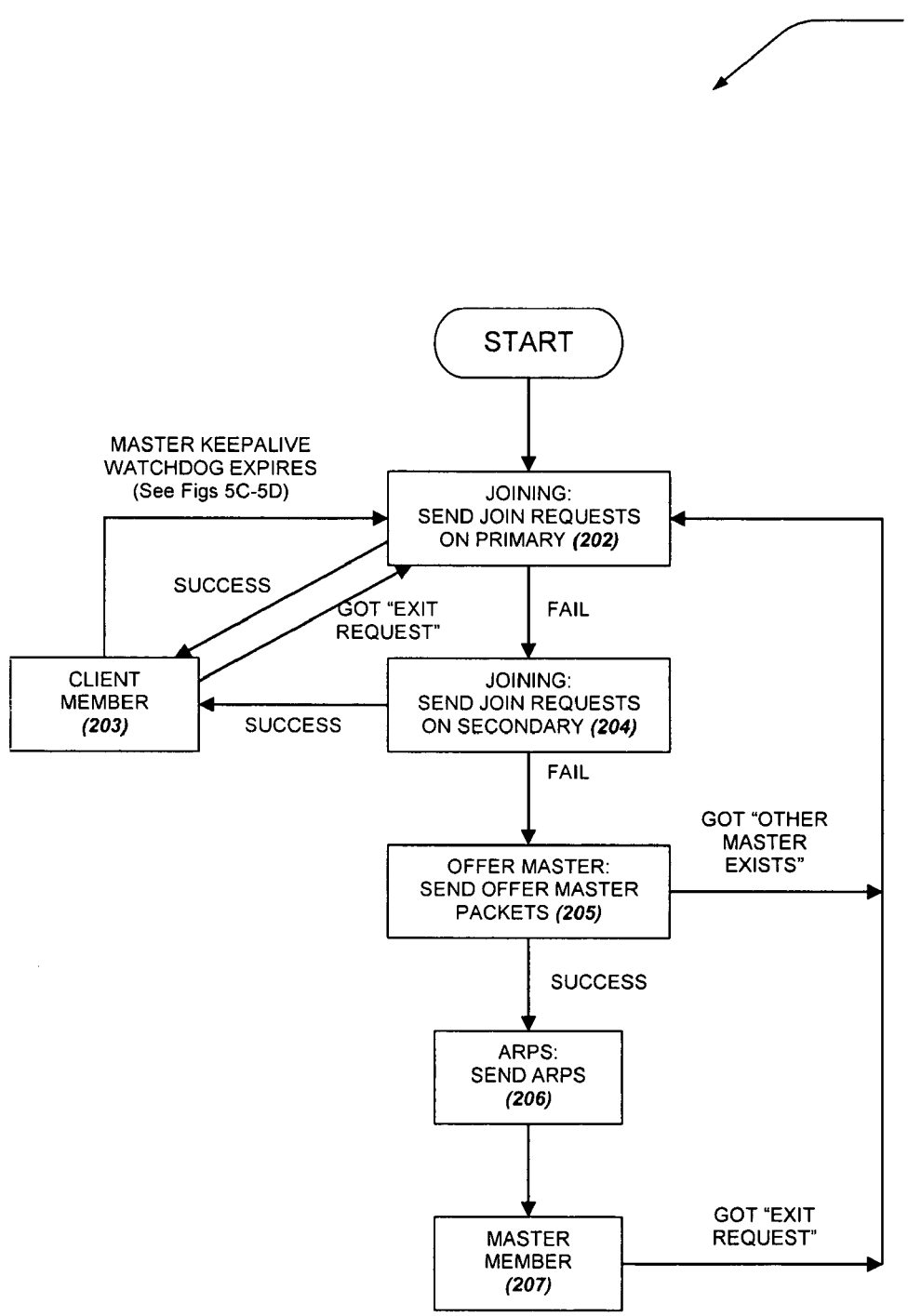
FIG. 3 illustrates a flow diagram generally showing one embodiment of a process for a network device to join and leave the cluster.

FIG. 3 illustrates a flow diagram generally showing one embodiment of a process for a network device to join and leave the cluster. Process 300 begins, after a start block, at block 202 when a network device tries to join the cluster. In one embodiment, this is accomplished by sending (broadcasting) a "join request" message on the primary protocol network. If the cluster master receives this "join request", it attempts to validate associated authentication information. If the cluster master determines the authentication information is invalid it sends a "join failed" message over the primary protocol network to the joining network device. If the cluster master determines that the authentication information valid, it sends an "OK to join" message over the primary protocol network to the joining network device.

If an "OK to join" message is received by the joining network device, process 300 flows to block 203, where the joining network device is designated a cluster member (sometimes known as a client or non-master). Additionally, the joining network device marks its interface to the primary protocol network as its "active protocol network."

If at block 202, the joining network device does not receive an "OK to join" message or a "join failed" message on the primary protocol network from the cluster master, processing flows to block 204.

At block 204, the joining network device sends out (broadcasts) a "join request" message on the secondary protocol network. If the cluster master receives this "join request", it attempts to validate the authentication information, and responds by sending the appropriate message to the system on the secondary protocol network. If an "OK to join" message is received, processing proceeds to block 203, where the joining network device is designated a cluster member (client or non-master). Additionally, the joining network device marks its interface to the secondary protocol network as its "active protocol network."

However, if at block 204, the joining network device does not get a "OK to join" message or a "join failed" message on the secondary protocol network from a cluster master, the joining network device concludes that it is the first cluster member of the cluster (i.e. no master unit exists), and processing proceeds to block 205. Additionally, if a master election mechanism is dynamic then processing also proceeds to block 205.

At block 205, the joining network device sends out an "offer master request" packet on the primary and secondary protocol networks, offering to become the cluster master. In one embodiment, the "offer master request" packet is broadcast over the primary and secondary protocol networks. If the joining network device receives an "other master exists" message, on either the primary or secondary protocol network, processing loops back to block 202, where the joining network device tries to join again. However, if the joining network device does not receive a response after a predetermined period of time processing flows to block 206. In one embodiment, the predetermined period of time is about 100 milliseconds. However, the invention is not so limited, and virtually any period of time may be employed.

At block 206, the cluster master sends a broadcast Address Resolution Protocol (ARP) response, or the like, on each of its cluster networks, to inform adjacent network devices what Ethernet address, and the like, to use for a corresponding cluster network address. Processing continues to block 207, where the joining network device now operates in the capacity of the cluster master. Processing may continue, until the cluster master receives an "exit request," in which instance, processing loops back to block 202.

The cluster master may store an active protocol network for each cluster member. When the cluster master accepts a new cluster member into the cluster, it records the network it used to send the "OK to join" message as the cluster member's active protocol network.

Due to latencies in the network, in packet processing, and the like, the cluster master may fail to respond to a cluster member's "join request" message on the primary protocol network before the cluster member send a "join request" message on the secondary protocol network. In this instance, the cluster master may be configured to recognize that the join request it received from the secondary protocol network is a duplicate of those it received on the primary protocol network, and ignore it. To enable the cluster master to detect duplicates, the cluster member may identify itself in the "join request" and "offer master" message using its network address on the primary protocol network.

Additionally, due to latencies in the network, in packet processing, and the like, the cluster master may receive a "join request" message on the secondary protocol network before it receives one on the primary protocol network, even though the joining network device sent the primary protocol network message first. If the cluster master sent an "OK to join" message to a cluster member on the secondary protocol network, and then receives a duplicate "join request" message on the primary protocol network, the cluster master may then send an "OK to join" message to the cluster member on the primary protocol network, and mark the primary protocol network as that cluster member's active protocol network. If a cluster member receives an "OK to join" message on both the primary and secondary protocol networks, it may mark the primary protocol network as its active protocol network.

A cluster member can take advantage of virtually any knowledge it has of device link state, and the like, to optimize this exchange. For example, although not illustrated in FIG. 3, if a cluster member detects that the device connecting it to the primary protocol network is inoperative, it can send a "join request" packet to the secondary protocol network. Such optimizations however, are not critical to the invention.

Illustrative Operation of a Cluster Master

After a cluster has formed, the cluster master may send a "master keepalive" message, or the like, on the primary and secondary protocol networks. The cluster members monitor these messages to detect failure of the master unit, and to determine their active protocol network. The interval between "master keepalive" messages is determined and adjusted using any of a variety of mechanisms, including, but not limited to those described by Adelman et al., in U.S. Pat. Nos. 6,078,957 and 6,006,259, both filed on Nov. 20, 1998, and which are both incorporated by reference herein. The cluster master may determine the keepalive interval independently for each protocol network, based on a network's observed packet loss, and the like.

When the cluster master exchanges a cluster protocol message with a cluster member, to assign work, for example, it may send the message on the cluster member's active protocol network. The cluster master may send a protocol message to different cluster members on different protocol networks. This may be done for example, because some of the cluster members may be able to use the primary protocol network, while other cluster members may not.

The cluster master may monitor "keepalive" messages sent from cluster members employing any of a variety of mechanisms. In one embodiment, the cluster master employs a watchdog timer. A cluster member may be considered "alive" so long as the cluster master receives its keepalives on one of the protocol networks. If the cluster master receives keepalives on more than one protocol network, the cluster master may prefer the primary protocol network as the cluster member's active protocol network.

FIGS. 4A-4D illustrate flow diagrams generally showing one embodiment of a process of a cluster master managing a cluster member (client) protocol network communication, according to one embodiment of the invention. Processes 400-700, shown in the figures, may operate in a cluster master of cluster 101 of FIG. 1.

Figure 4A:
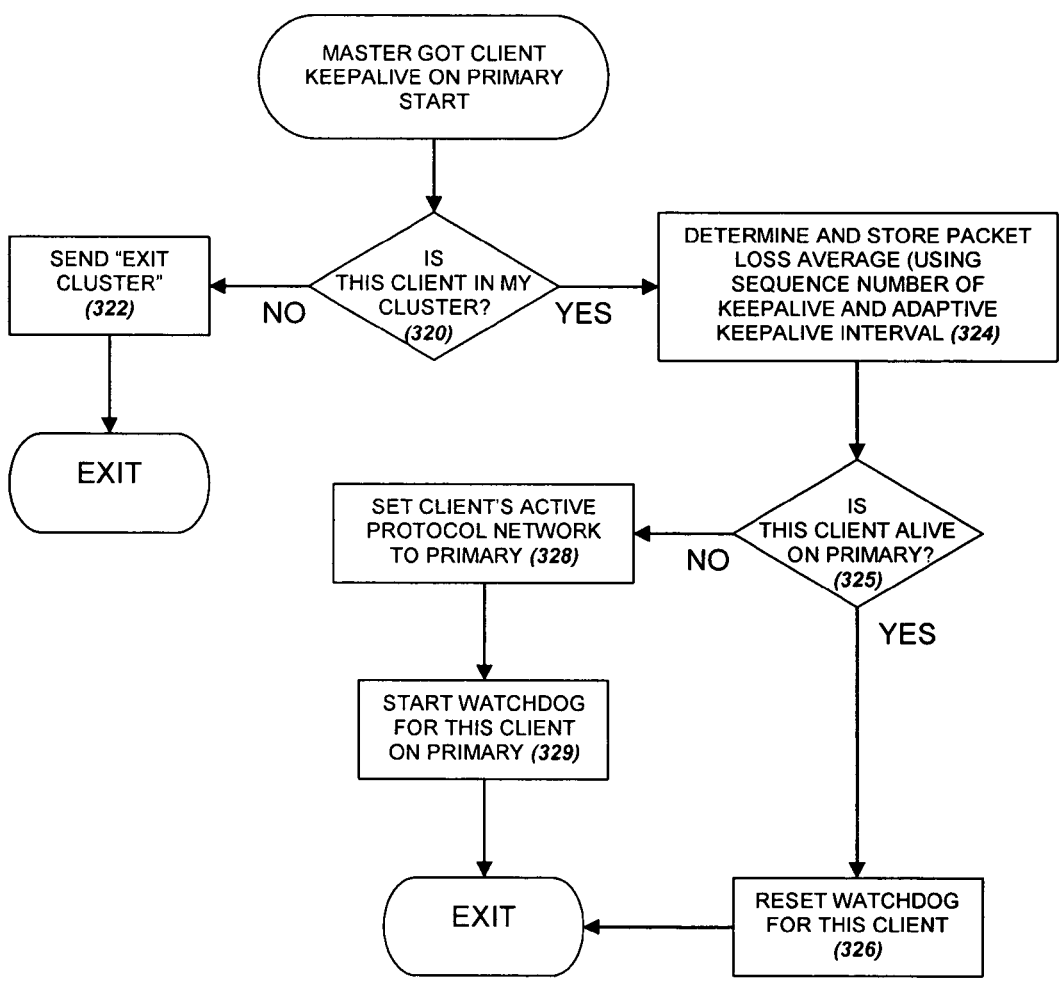
FIGS. 4A-4D illustrate flow diagrams generally showing one embodiment of a process for a cluster master managing a cluster member (client) protocol network communication.

FIG. 4A illustrates a flow diagram generally showing one embodiment of a process of a cluster master managing a cluster member protocol network communication when the cluster master receives a "keepalive" on the primary protocol network for a cluster member. Process 400 proceeds to decision block 320, where a determination is made whether the received "keepalive" is from a cluster member. If it is determined that the message is not from a cluster member, processing branches to block 322, where the cluster master sends an "exit cluster" message to the network device sending the "keepalive." Process 400 then exits to a calling process to perform other operations.

If at decision block 320, however, the received "keepalive" is from a member of its cluster, processing proceeds to block 324, where packet loss information, and the like, is determined and stored. In one embodiment, a packet loss average is determined employing a variety of characteristics, including, but not limited to sequence number of a keepalive, an adaptive keepalive interval, and the like.

Process 400 continues next to decision block 325, where a determination is made whether the cluster member (client) is alive on the primary protocol network. That is, if it is determined that the cluster master receives a keepalive on the primary protocol interface for a cluster member whose active protocol network is the secondary protocol network, processing proceeds to block 328, where the master sets the member's active protocol network to the primary protocol network. Process 400 continues to block 329, where the watchdog timer for this client member is started for the primary protocol network. Process 400 then exits to a calling process to perform other operations.

However, if at decision block 325, it is determined that the client member is alive on the primary protocol network, processing continues to block 326, where the watchdog timer for this cluster member is reset. Process 400 then exits to a calling process to perform other operations.

Figure 4B:
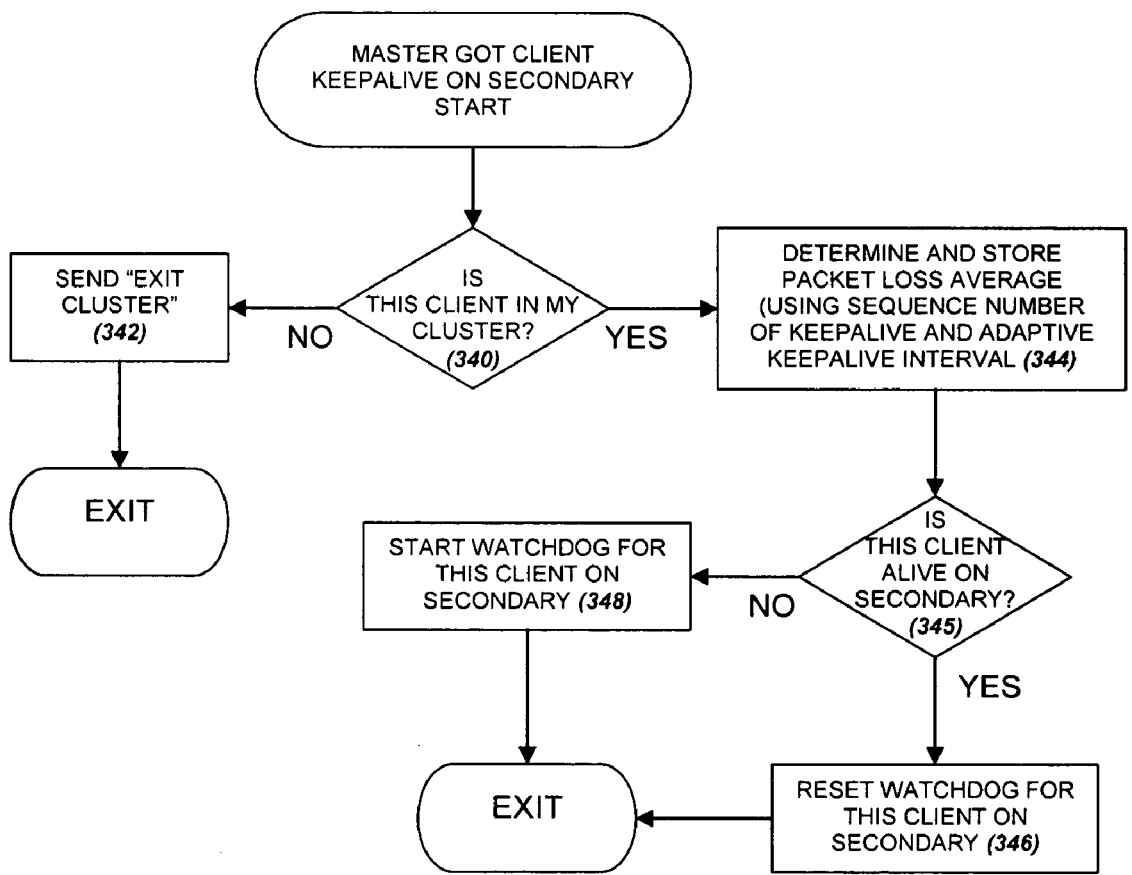

FIG. 4B illustrates a flow diagram generally showing one embodiment of a process of a cluster master managing a cluster member protocol network communication when the cluster master receives a "keepalive" on the secondary protocol network for a cluster member. As shown in the figure, process 500 begins, at decision block 340, when the cluster master receives a keepalive on the secondary protocol network. At decision block 340, a determination is made whether the keepalive is received from a network device that is a member of the cluster master's cluster. If it is determined that the network device is a member of the cluster master's cluster, processing process to block 344; otherwise, processing branches to block 342, where the cluster master sends the network device an "exit cluster" message. Processing then exits to a calling process to perform other operations.

At block 344, the cluster master determines and stores packet loss information, and the like. In one embodiment, a packet loss average is determined employing a variety of characteristics, including, but not limited to sequence number of a keepalive, adaptive keepalive interval, and the like. Processing continues to decision block 345, where it is determined whether the cluster member is alive on the secondary protocol network. That is, if it is determined that the cluster master receives a keepalive on the secondary protocol network for a cluster member whose active protocol network is the primary protocol network, processing branches to block 348, where the cluster master leaves the cluster member's active protocol network unchanged. A watchdog timer for this cluster master is started however, for the secondary protocol network. Processing then exits to a calling process to perform other operations.

If, at decision block 345, the cluster member (client) is alive on the secondary protocol network, processing proceeds to block 346 where the watchdog timer is reset for this cluster member for its secondary protocol network. Processing then exits to a calling process to perform other operations.

Figure 4C:
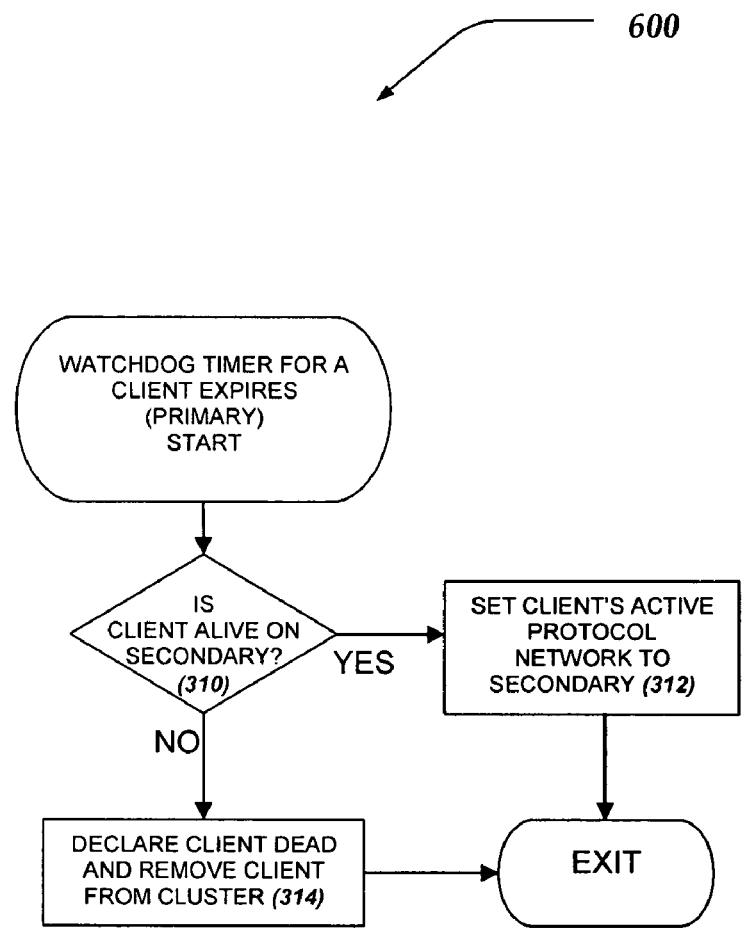

FIG. 4C illustrates flow diagram generally showing one embodiment of a process of a cluster master managing a cluster member protocol network communication when a failure is detected on the primary protocol network. As shown in the figure, process 600 begins, after a start block, at decision block 310, when the cluster master fails to receive a cluster member's (client's) keepalive on the primary protocol network within a predefined interval (the cluster member "times out").

At decision block 310, a determination is made whether the cluster master is still receiving the cluster member's keepalives on the secondary protocol network. If it is, then processing branches to block 312, where the cluster master retains the network device as a cluster member. The cluster master may further set the cluster member's active protocol network to the secondary protocol network. In one embodiment, the cluster master may also generate events such as SNMP traps, and the like, to indicate that the active protocol network on a cluster member has changed. Processing then exits to a calling process to perform other operations.

If it is determined, at decision block 310, that the cluster member has timed out on both primary and secondary protocol networks, processing branches to block 314, where the cluster master may declare the cluster member dead and remove it from the cluster. Processing then exits to a calling process to perform other operations.

Figure 4D:
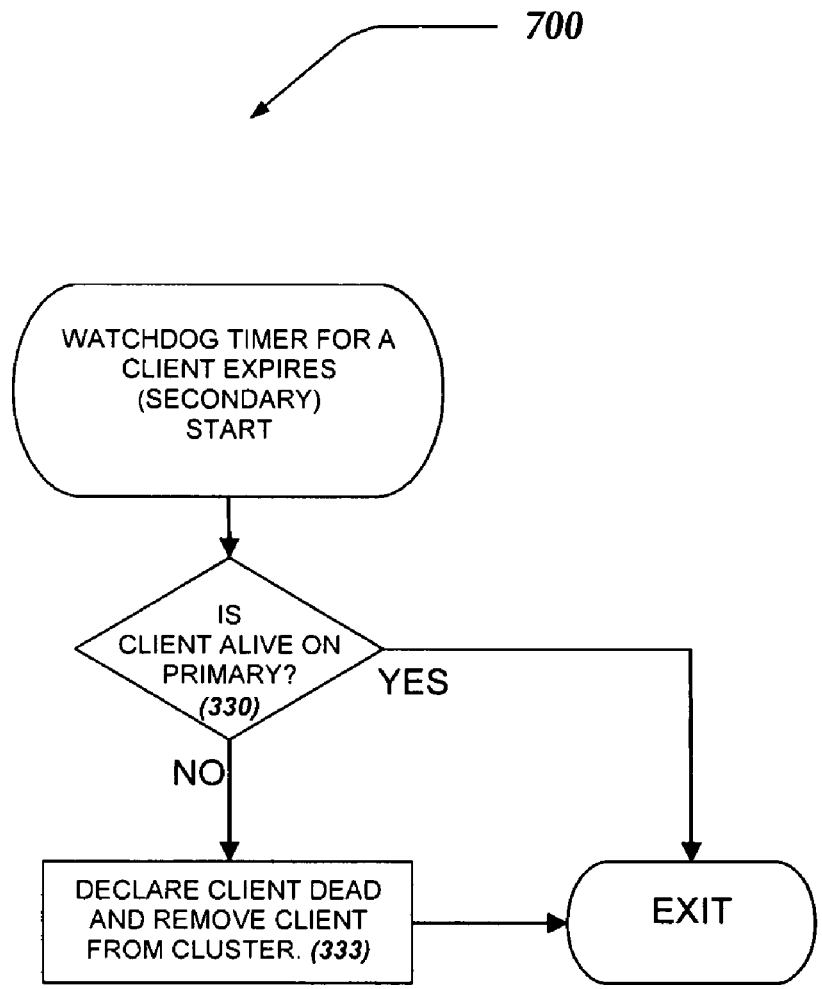

FIG. 4D illustrates a flow diagram generally showing one embodiment of a process of a cluster master managing a cluster member protocol network communication when a failure is detected on the secondary protocol network. If the cluster master fails to receive a cluster member's keepalive on the secondary protocol network within a predefined interval (the cluster member "times out"), processing flows to decision block 330. At decision block 330, a determination is made whether the cluster master is still receiving the cluster member's keepalives on the primary protocol network. If it is, then the cluster master retains the system as a cluster member and leaves the member's active protocol network unchanged. Processing exits process 700 to a calling process, to perform other actions.

However, if it is determined that the cluster member has timed out on both primary and secondary protocol networks, processing flows to block 333, where the master declares the cluster member dead and removes it from the cluster. Processing then exits process 700, to perform other operations.

A situation may arise where the cluster master exchanges messages with network devices that are not members of the cluster. For example, the cluster master may send "other master" messages when resolving master contention, or may send "exit request" messages to network devices that erroneously think they are in the cluster. The cluster master may send these messages in response to messages it receives from these network devices. In the absence of an active protocol network for these network devices (as they are not cluster members), the cluster master may send its response message on the same network as it received message from these network devices.

Furthermore, the cluster master can take advantage of virtually any knowledge it has of device link state, and the like, to optimize its behavior. For example, in one embodiment, if the cluster master detects that the device connecting it to the primary protocol network is inoperative, it can set all the cluster members' active protocol networks to the secondary protocol network, and stop sending master keepalives on the primary protocol network.

Illustrative Operation of a Cluster Member

A non-master cluster member (clients) may send a keepalive message and monitors a watchdog timer associated with the cluster master. Each cluster member may send a "keepalive" message on both protocol networks at an interval predetermined in a "master keepalive" message, or the like. If a cluster member does not receive a "master keepalive" message, or the like, on a protocol network, it may not send any "keepalive" message on that protocol network.

Moreover, each cluster member may monitor "master keepalive" messages sent from the cluster master using a watchdog timer, and the like. A cluster member may consider the cluster master "alive" so long as the cluster master is still sending keepalives on one of the protocol networks.

FIGS. 5A-D illustrate flow diagrams generally showing one embodiment of a process of a cluster member (client) managing a protocol network communication with the cluster master. In one embodiment, processes 800-1100 of FIGS. 5A-5D may be deployed in cluster members 102-105 of FIG. 1.

Figure 5A:
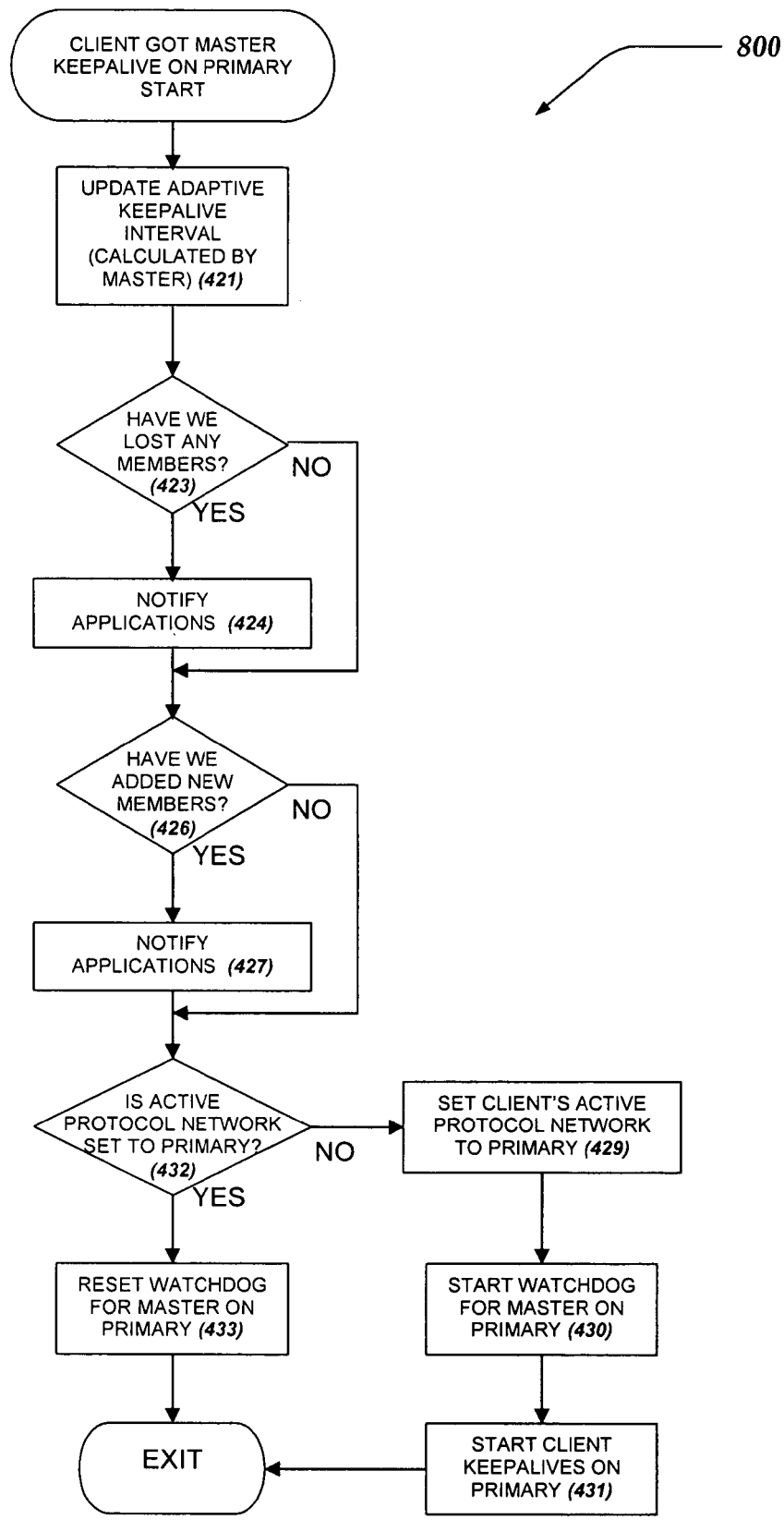
FIGS. 5A-D illustrate flow diagrams generally showing one embodiment of a process of a cluster member (client) managing a protocol network communication with the cluster master, according to one embodiment of the invention.

FIG. 5A illustrates a flow diagram generally showing one embodiment of a process where the cluster member receives a cluster master "keepalive" on the primary protocol network. Process 800 of FIG. 5A, begins after a start block, at block 421, where a keepalive interval is updated. In one embodiment, the keepalive interval is an adaptive interval. In another embodiment, the keepalive interval is determined by the cluster master.

Processing next proceeds to decision block 423, where it is determined from information in the cluster master "keepalive" whether the cluster has lost any cluster members. Members of the cluster may be lost for any of a variety of reasons, including non-connect with the cluster master, network failures, hardware failures, and the like. If it is determined that a cluster member is not lost, processing branches to decision block 426. If a cluster member is lost, processing proceeds to block 424, where applications, and the like, may be notified regarding the loss of the cluster member. Additionally, although not shown, the cluster member may update membership and active protocol network information of other cluster members from the information in the cluster master "keepalive," that it maintains regarding the cluster members. Processing continues to decision block 426.

At decision block 426, a determination is made from information in the cluster master "keepalive" whether the cluster has added a new cluster member. If a new cluster member has not been added, processing continues to decision block 432; otherwise, processing continues to block 427, where applications, and the like, are notified of the addition. Processing continues to decision block 432.

At decision block 432, a determination is made whether the cluster member's active protocol network is the primary protocol network. If is determined that the cluster member's active protocol network is not the primary protocol network, processing proceeds to block 429, where the cluster member sets its active protocol network to the primary protocol network. Processing continues to block 430, where the cluster member starts the watchdog timer for the cluster master on the primary protocol network, and continues to block 431, where it further starts sending "keepalive" messages on the primary protocol network. Processing then exits to a calling process to perform other operations.

If, at decision block 432, it is determined that the cluster member's active protocol network is the primary protocol network, processing proceeds to block 433 where the watchdog timer is reset for the cluster master on the primary protocol network. Processing then exits to a calling process to perform other operations.

Figure 5B:
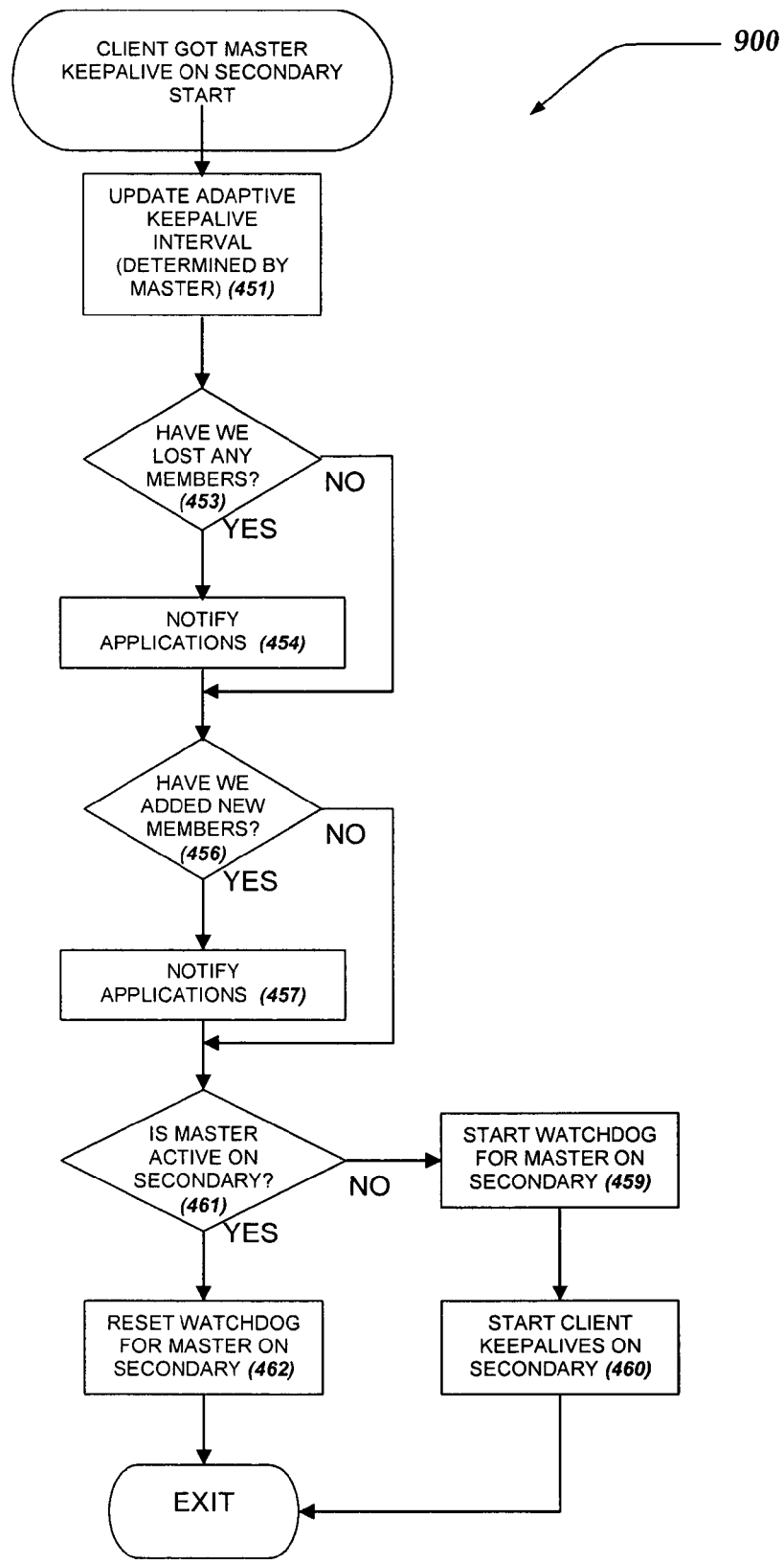

FIG. 5B illustrates a flow diagram generally showing one embodiment of a process where the cluster member receives a cluster master "keepalive" on the secondary protocol network. Process 900 of FIG. 5B, begins after a start block, at block 451, where a keepalive interval is updated. In one embodiment, the keepalive interval is an adaptive interval. In another embodiment, the keepalive interval is determined by the cluster master. Process 900 then proceeds through blocks 453 through 457, which operate substantially similar to blocks 423 through 427 of FIG. 5A.

Process 900 continues at decision block 461, where a determination is made whether the cluster master's active protocol network is the secondary protocol network. If the cluster master's active protocol network is the primary protocol network, processing continues to block 459, where the member leaves its active protocol network unchanged, and starts a watchdog timer for the cluster master on the secondary protocol network. Processing next proceeds to block 460, where the cluster member further starts sending "keepalive" messages on the secondary protocol network. Processing then exits to a calling process to perform other operations.

If, however, the cluster master's active protocol network is the secondary protocol network, processing proceeds to block 426 where the client member resets the watchdog timer for the cluster master on the secondary protocol network. Processing then exits to a calling process to perform other operations.

Figure 5C:
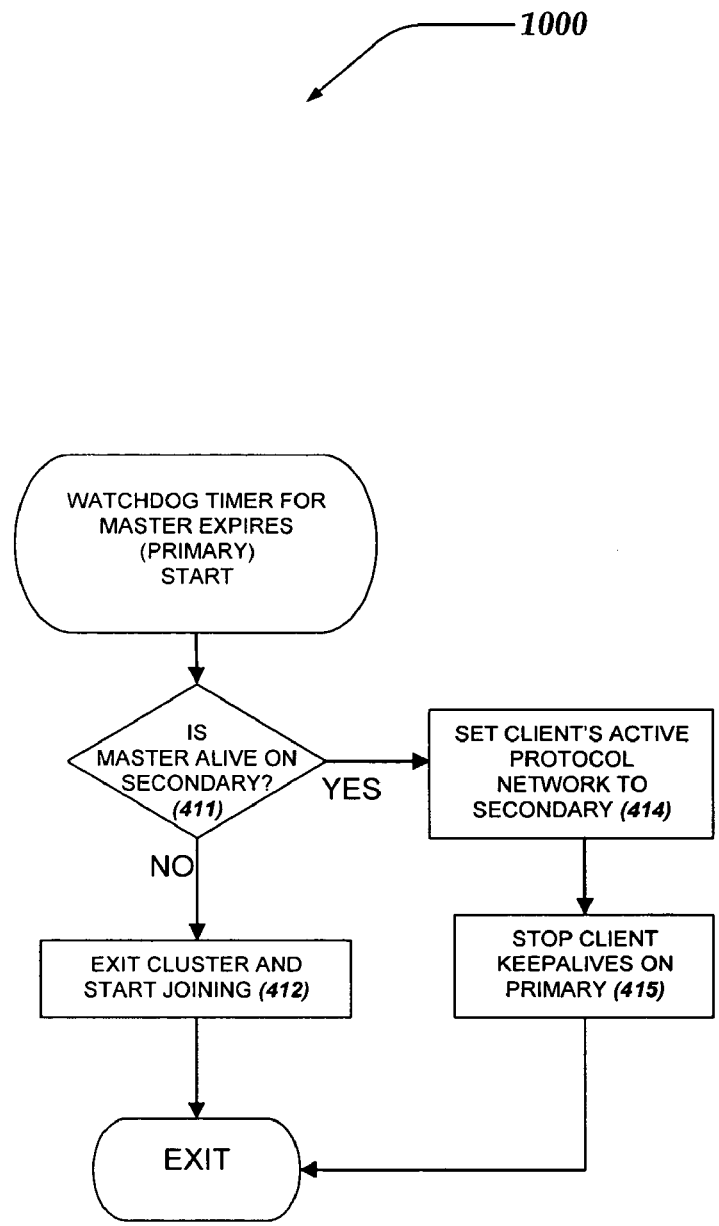

FIG. 5C illustrates a flow diagram generally showing one embodiment of a process where a watchdog timer, or the like, for a cluster master expires on a primary protocol network (the cluster master "times out"). Process 1000 begins, after a start block, at decision block 411, where a determination is made whether the cluster member is still receiving the cluster master's keepalives on the secondary protocol network. If it is, then processing branches to block 414 where the cluster member sets its active protocol network to the secondary protocol network. Processing proceeds to block 415, where the cluster member (client) stops sending "keepalive" messages on the primary protocol network. Process 1000 then exits to a calling process to perform other operations.

However, if at decision block 411, it is determined that the cluster master has timed out on both primary and secondary protocol networks, processing continues to block 412, where the cluster member declares the cluster master dead. In one embodiment, the cluster member also leaves the cluster. In another embodiment, the cluster member tries to rejoin the cluster. Process 1000 then exits to a calling process to perform other operations.

Figure 5D:
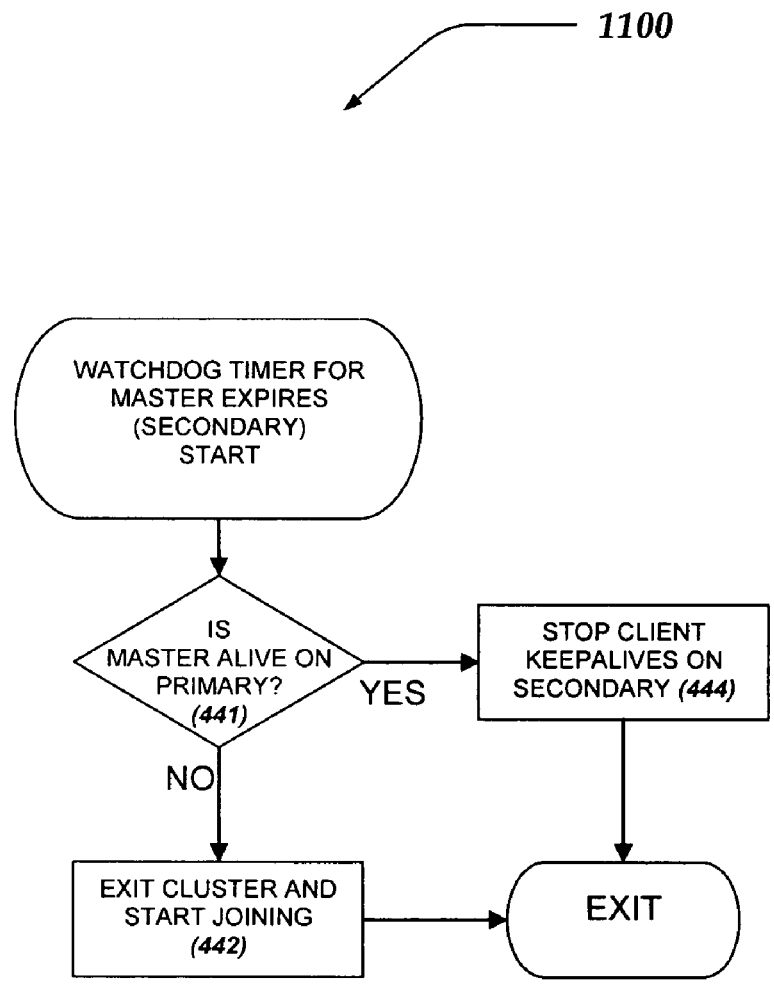

FIG. 5D illustrates a flow diagram generally showing one embodiment of a process where a watchdog timer, or the like, for a cluster master expires on a secondary protocol network (the cluster master "times out"). Process 1100 begins, after a start block, at decision block 441, where a determination is made whether the cluster member is still receiving the cluster master's keepalives on the primary protocol network. If it is, then processing flows to block 444, where the cluster member leaves its active protocol network unchanged, but stops sending "keepalive" messages on the secondary protocol network. Processing then exits to a calling process to perform other operations.

If, however, at decision block 441, it is determined that the cluster master has timed out on both primary and secondary protocol networks, processing proceeds to block 442, where the cluster member declares the master dead, and leaves the cluster. The cluster member may further try to rejoin the cluster. Process 1100 then exits to a calling process to perform other operations.

A cluster member may take advantage of virtually any knowledge it may obtain pertaining to a device link state, and the like, to optimize its behavior. For example, if a cluster member detects that the device connecting it to the primary protocol network is inoperative it can set its active protocol networks to the secondary protocol network.

Although the above processes are described employing watchdog timers, the present invention is not so limited, and virtually any mechanism may be employed to determine when to make a determination to change the active protocol network, exit the cluster, join the cluster, and the like.

The invention is directed towards eliminating the primary protocol network as a single point of failure that may arise for any of a number of reasons. With the use of multiple protocol networks, the impact of these failures on cluster membership, service interruptions, and the like, is minimized. Moreover, multiple protocol networks are directed toward increasing the reliability and robustness of the cluster in the event of a partial or even a complete failure of a single network device, element, and the like. Thus, although, the invention has been described employing a primary and secondary protocol network, the present invention is not so limited, and virtually any number of protocol networks may be employed without departing from the scope of the present invention.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A cluster member in a cluster system comprising a plurality of cluster members, one of the members being dynamically configured to operate as a cluster master, the member comprising:
   a transceiver arranged to send and to receive a packet over a network;
   a processor, coupled to the transceiver, that is configured to perform actions, including;
   determining an active protocol network selected from at least one of a primary protocol network and a secondary protocol network; and
   switching the active protocol network to another protocol network without leaving the cluster system upon detecting a failure in the active protocol network by monitoring for and failing to receive a single message over the active protocol network from the cluster master.

2. The cluster member of claim 1, wherein determining the active protocol network further comprises sending a message on at least the primary protocol network and the secondary protocol network to the cluster master.

3. The cluster member of claim 1, wherein determining the active protocol network further comprises:
   sending a first join request message on the primary protocol network;
   sending a second join request message on the secondary protocol network based on a response to the first join request message being unavailable on the primary protocol network; and
   designating the cluster member as a cluster member and identifying the secondary protocol network as the active protocol network based on receiving a response to the second join request message indicating that it is okay to join the cluster system.

4. The cluster member of claim 1, wherein detecting the failure in the active protocol network further comprises failing to receive a message on the active protocol network from the cluster master after a predetermined period of time.

5. A method for managing a failure in a cluster system comprising a plurality of cluster members, one of the members being dynamically configured to operate as a cluster master, the method comprising:
   determining an active protocol network, wherein the active protocol network is selected from at least one of a plurality of protocol networks; and
   switching the active protocol network to another protocol network without leaving the cluster system upon detecting a failure in the active protocol network by failing to receive a message from the cluster master, wherein the other protocol network is selected from an available protocol network in the plurality of protocol networks.

6. The method of claim 5, further comprising designating a primary protocol network from the plurality of protocol networks based, in part, on a characteristic associated with a the primary protocol network.

7. The method of claim 5, wherein detecting the failure further comprises failing to receive a message on the active protocol network after a predetermined period of time.

8. The method of claim 5, further comprising:
   determining if at least one protocol network is available; and
   leaving the cluster system upon determining that all protocol networks in the plurality of protocol networks are unavailable.

9. A cluster system comprising a plurality of cluster members, one of the members being dynamically configured to operate as a cluster master, the cluster system further comprising:
   the plurality of cluster members configured to perform actions, comprising:
      determining an active protocol network selected from at least one of a primary protocol network and a secondary protocol network; and
      switching the active protocol network to another protocol network without leaving the cluster system upon detecting a failure in the active protocol network by failing to receive a message from the cluster master; and
   the cluster master that is configured to perform actions, comprising:
      maintaining information associated with the active protocol network for the cluster member;
      monitoring the active protocol network associated with the cluster member; and
      setting the active protocol network to the other protocol network upon detecting another failure in the active protocol network by failing to receive a message from the cluster member.

10. The cluster system of claim 9, wherein detecting the failure in the active protocol network further comprises monitoring for a protocol message from the cluster master within a predetermined period of time.

11. The cluster system of claim 9, wherein the cluster master is configured to perform actions, further comprising:
   designating the cluster member as unavailable and removing the cluster member from the cluster system if all protocol networks for the cluster member are unavailable.

12. The cluster system of claim 9, wherein determining the active protocol network further comprises sending a protocol message on at least the primary protocol network and the secondary protocol network.

13. A cluster system comprising a plurality of cluster members, one of the members being dynamically configured to operate as a cluster master, the cluster system comprising:
   a means for sending and receiving a protocol message over a network;
   a means for determining an active protocol network selected from at least two protocol networks;
   a means for detecting a failure in the active protocol network based on a failure to receive a message from the cluster master; and
   a means for switching the active protocol network to an available protocol network without leaving the cluster system if the failure is detected in the active protocol network.

* * * * *